United States Patent
Wu

[11] Patent Number: 6,069,464
[45] Date of Patent: May 30, 2000

[54] DRIVING APPARATUS FOR AN IMAGE PROCESSING SYSTEM

[75] Inventor: Sau-Hsuan Wu, Chung Ho, Taiwan

[73] Assignee: Umax Data Systems Inc., Hsinchu, Taiwan

[21] Appl. No.: 09/164,341

[22] Filed: Oct. 1, 1998

[51] Int. Cl.$^7$ .................................................. G05B 11/42
[52] U.S. Cl. ......................... 318/610; 318/798; 318/799; 318/801; 318/811
[58] Field of Search .................................. 318/798–801, 318/807, 720–723, 811, 486, 474, 482, 610

[56] References Cited

U.S. PATENT DOCUMENTS

| | | | |
|---|---|---|---|
| 4,608,527 | 8/1986 | Glennon et al. | 318/685 |
| 4,618,808 | 10/1986 | Ish-Shalom et al. | 318/696 |
| 4,752,780 | 6/1988 | Pipkin | 343/760 |
| 5,049,797 | 9/1991 | Phillips | 318/568.16 |
| 5,148,020 | 9/1992 | Machida | 250/231.16 |
| 5,202,610 | 4/1993 | Frye et al. | 318/6 |
| 5,463,299 | 10/1995 | Futami et al. | 318/618 |
| 5,493,188 | 2/1996 | Yoshikawa et al. | 318/254 |
| 5,519,297 | 5/1996 | Kono et al. | 318/594 |
| 5,612,599 | 3/1997 | Itami et al. | 318/254 |
| 5,691,616 | 11/1997 | Iwashita | 318/615 |
| 5,869,945 | 2/1999 | Ha et al. | 318/600 |

*Primary Examiner*—Robert E. Nappi
*Assistant Examiner*—Rita Leykin
*Attorney, Agent, or Firm*—McDermott Will & Emery

[57] ABSTRACT

The present invention propose a driving apparatus for an image processing system. A DC motor with a feedback controlling system is utilized as the driving apparatus. With the design of the present invention, the accuracy of the position control can be increased and the prior art problem of missing steps and unequalled steps can be eliminated. The driving apparatus of the present invention includes a DC motor, a position detecting device, an error counter, a controlling circuit, and a driving circuit. The position detecting device is employed for detecting positions of the DC motor in order to generate feedback signals. The error counter is responsive to input signals and the feedback signals for generating error signals. The controlling circuit is responsive to the error signals for controlling the DC motor. The driving circuit is responsive to the controlling circuit for driving the DC motor.

4 Claims, 4 Drawing Sheets

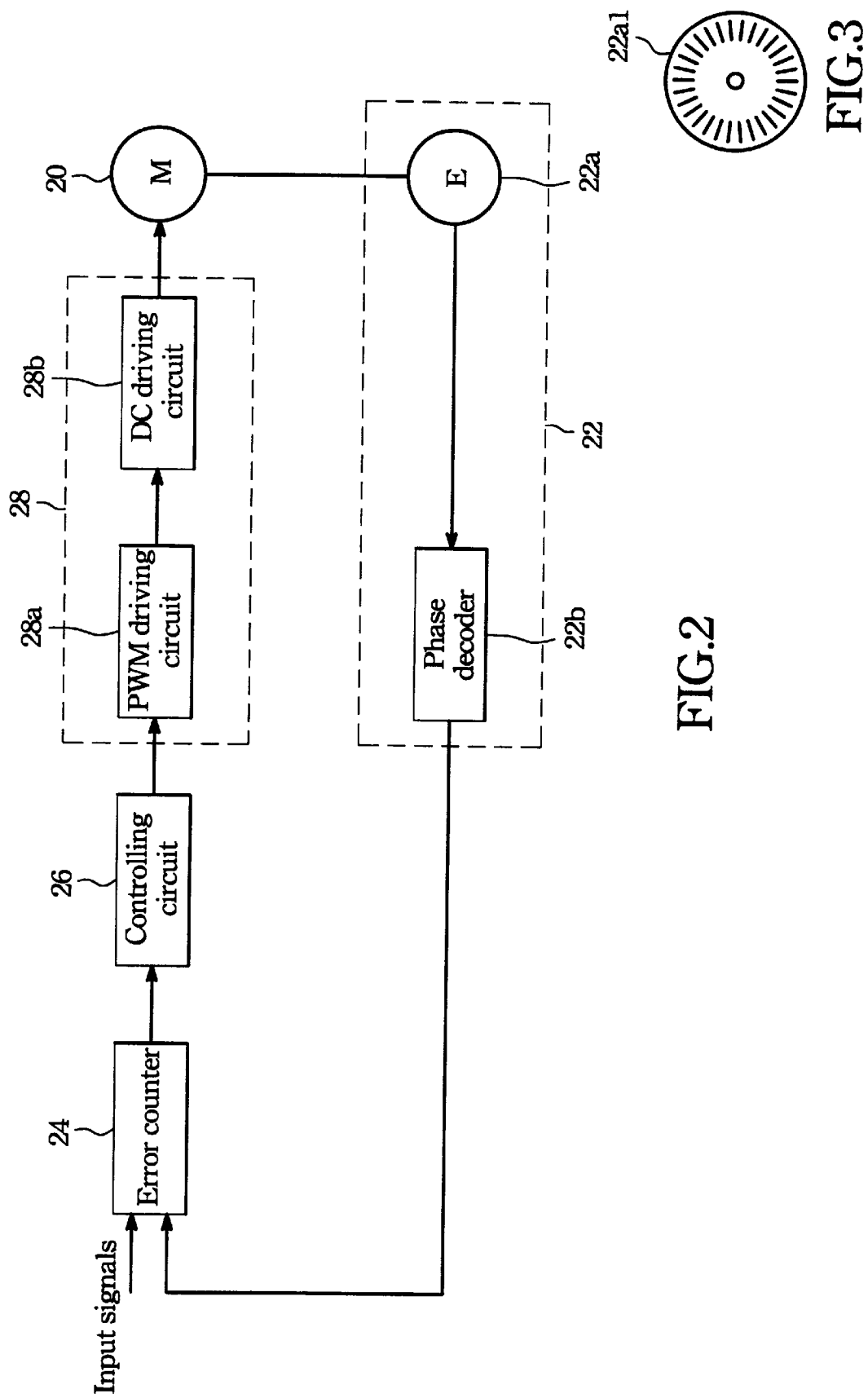

and fetching better power efficiency and simpler controlling mechanism. The prior art problem of unequal stepping is eliminated in the present invention.

DRIVING APPARATUS FOR AN IMAGE PROCESSING SYSTEM

FIELD OF THE INVENTION

The present invention relates to a driving apparatus, and more specifically, to a driving apparatus for the position control in an image processing system. The driving apparatus with a DC motor can be employed for the moving mechanism in a scanner.

BACKGROUND OF THE INVENTION

The electrical industry has been developed to one of the most important industries in the twentieth century. With the fast progressing in various kinds of computing and processing system, lots of electrical devices including computer, communication, and consumer electronics are employed in our daily life. In recent years, the application of image processing apparatus, in combining with the raising processing and storage ability of the computing system or the processors, plays an vital role in image capturing, processing, and transferring usage.

In the image capturing system like scanners and the image outputting system like printers, a driving apparatus is used for position control. Without limiting the scope of the present invention, a flatbed scanner is utilized as an illustrative example. Referring to FIG. 1, for a flatbed scanner to capture the image on a document, the document is placed still and a scanning head 10 is moved in the direction 12 to capture the image line-by-line. In traditional scanners or other kinds of image processing systems like printers, a stepping motor 14 is used as the driving apparatus for moving and position control. The stepping motor is designed to be driven by a driving or controlling system 16 in a step-by-step way and can be easily controlled with reduced cost in the simplified open-loop controlling system under low complexity.

In the application of the image processing, high accuracy is needed to achieve improved image quality. However, the conventional application of the stepping motor has several disadvantages. The cost of the stepping motor, which has a complex structure in the rotor or the stator, is higher than other kinds of motors, like DC motors. The high cost in the driving unit is hard to be lowered down especially on highly competitive products.

The step-by-step driving characteristics of the stepping motor is achieved by the design and wiring of coils on the rotor or the stator. The driving ability, namely the driving torque, is quite limited under the step-by-step operating mechanisms. If the friction of the whole system to be driven is too large, the stepping motor might miss or neglect the step under insufficient output torque. Thus the traditional stepping motor-driven system is found to have the problem of "missing steps". However, since the driving of the stepping motor is generally a one-way system without positional feedback, the steps missed are not identified by the system. With the unidentified missed steps, the captured image of the scanner might have repeated scanning lines in the middle of the document or some remained lines missed at the end of the document. The image on the document is thus scanned with above-identified errors and the correctness of the image is damaged.

Besides, under the design of the wired coils on the rotor or the stator, most stepping motors have limited accuracy of each stepped angle. The unequal stepped angles cause the moving of the image capturing head to have unequal steps or pitches. Some steps might be bigger than other steps, and the captured image is found to have a distortion problem. Since the problem is caused mainly by the stepping motor, the reduced accuracy of the image is hard to be compensated from modifying the system design or the processing software.

In addition to the above identified disadvantages, the problem of vibration and noise generated by the stepping motor also have negative effects. The accuracy, stability, and operation life of the system can be reduced under disturbing vibrations during the operating of the driving system. The noise problem further reduce the stability and competitive ability of the products.

In light of above, the stepping further has the problem of unable to operate at high speed. Therefore, an improved driving apparatus, especially a driving apparatus for the position control in the image processing system, is highly needed to improve the quality, correctness, and operating speed of the image processing or image capturing processes. What is needed is a driving system with simplified design and reduced cost to increase the stability and competitive ability of the products.

SUMMARY OF THE INVENTION

The present invention proposes a driving apparatus for an image processing system. A DC (direct current) motor is employed with a feedback controlling system. The prior art problem of the stepping motor on missing steps and unequalled steps can be eliminated. With the reduced vibration and noise problem of the system of the present invention, the accuracy of the image processing can be raised.

The driving apparatus of the present invention includes a DC motor, a position detecting device, an error counter, a controlling circuit, and a driving circuit. The position detecting device is employed for detecting positions of the DC motor in order to generate feedback signals. The error counter is responsive to input signals and the feedback signals to generate error signals. The controlling circuit is responsive to the error signals for generating a control signal for the DC motor. The driving circuit is responsive to the control signal in order to drive the DC motor.

BRIEF DESCRIPTION OF THE PREFERRED EMBODIMENT

The foregoing aspects and many of the attendant advantages of this invention will become more readily appreciated and better understood by referencing the following detailed description, when taken in conjunction with the accompanying drawings, wherein:

FIG. 2 illustrates a schematic functional block diagram of a driving apparatus in accordance with the present invention;

FIG. 3 illustrates a schematic diagram of a circular code wheel in accordance with the present invention;

DETAILED DESCRIPTION OF THE PREFERRED EMBODIMENT

Figure 1:
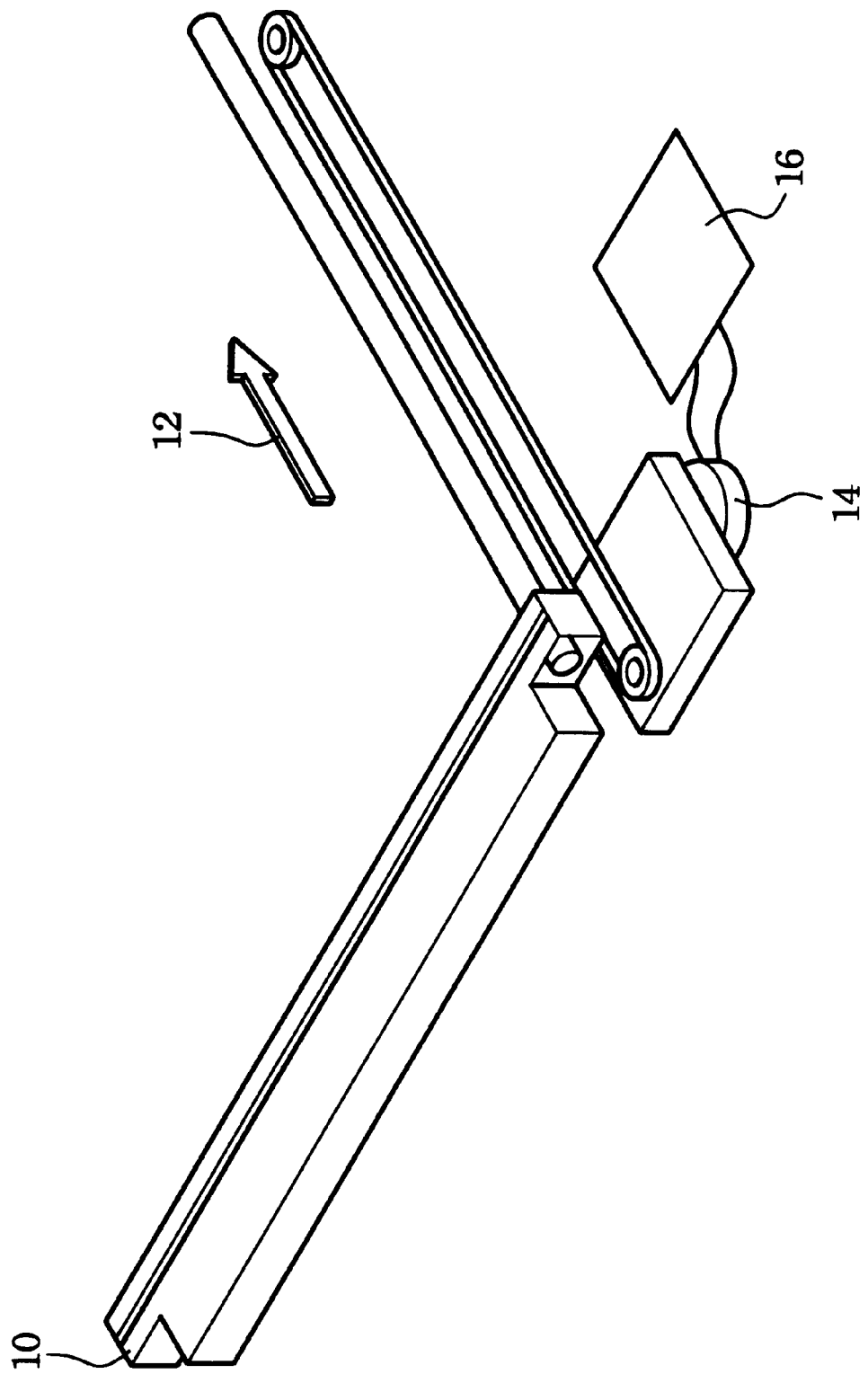
FIG. 1 is a schematic diagram of a scanning head and a driving apparatus of a flatbed scanning system.

The present invention propose a driving apparatus for an image processing system. A DC motor with a feedback controlling system is utilized as the driving apparatus. With the design of the accompanying controlling and driving circuit, the accuracy of the position control of the image processing system can be significantly increased. The prior art problem of the stepping motor on missing steps and unequal steps can be eliminated. The system driven by the DC motor in the present invention also has reduced vibration and noise. Thus the accuracy of the image processing can be raised with reduced cost of the system design.

Turning to FIG. 2, a functional block schematic diagram of the driving apparatus proposed in the present invention is illustrated. The driving apparatus performs a position control function and can be used in the image processing system. As an example, the driving apparatus with the function of position control can be employed in the image capturing system like scanners, or more specifically flatbed scanners. The driving apparatus includes a DC motor 20, a position detecting means 22, an error counter 24, a controlling circuit 26, and a driving circuit 28.

The DC motor 20 can be motor which is driven by direct current. The position detecting device 22 is utilized for detecting positions of the DC motor 20 to generate feedback signals. The position detecting device 22 can detect both positional and directional movements of the DC motor 20. In the case, the position detecting device 22 includes a position encoder 22a and a phase decoder 22b. The position encoder 22a is a detecting device for detecting the motion at the output end of the motor 20 and encode the position as position signals. In the preferred embodiments, the position encoder 22a can be an optical position detector with code wheel or strip. As an example, a circular code wheel can be mounted directly onto the output shaft of the DC motor 20. An example of the circular code wheel 22a 1 is illustrated in FIG. 3. The transparent or reflective pattern on the circular code wheel 22a 1 can be detected with two or more optical detectors to generate encoded position signals. The phase detector is then responsive to the position signals to detect the position of the shaft and the moving direction. The moving direction can be decoded by comparing the phase difference between the position signals detected by different detectors. Therefore, the feedback signals which includes positional and directional information is send out by the phase detector 22b to the error counter 24. Alternatively, the circular code wheel 22a 1 can be replaced with a linear code strip which can be mounted onto a moving mechanism driven by the DC motor. As an example, the linear code strip can be mounted onto the scanning head 10 in FIG. 1.

Referring to FIG. 2, the error counter 24 is responsive to input signals and the feedback signals from the position detecting device 22, in order to generate error signals. The input signals is the signals with the data of commanded positions from the image capturing system. Therefore, the difference between the input signals and the feedback signals is the difference between the expected position and the actual position of the DC motor.

The controlling circuit 26 is then responsive to the error signals for controlling the DC motor 20. A control scheme can be applied into the controlling circuit 26 to determine how to control the motion of the DC motor, by referencing the error signals. In the case, the controlling circuit 26 can perform the controlling schemes like a phase lead scheme, a phase lag scheme, or a PID (proportional-integral-differential) scheme. Generally, the controlling circuit 26 can be realized by an application specified integrated circuit (ASIC).

Figure 4:
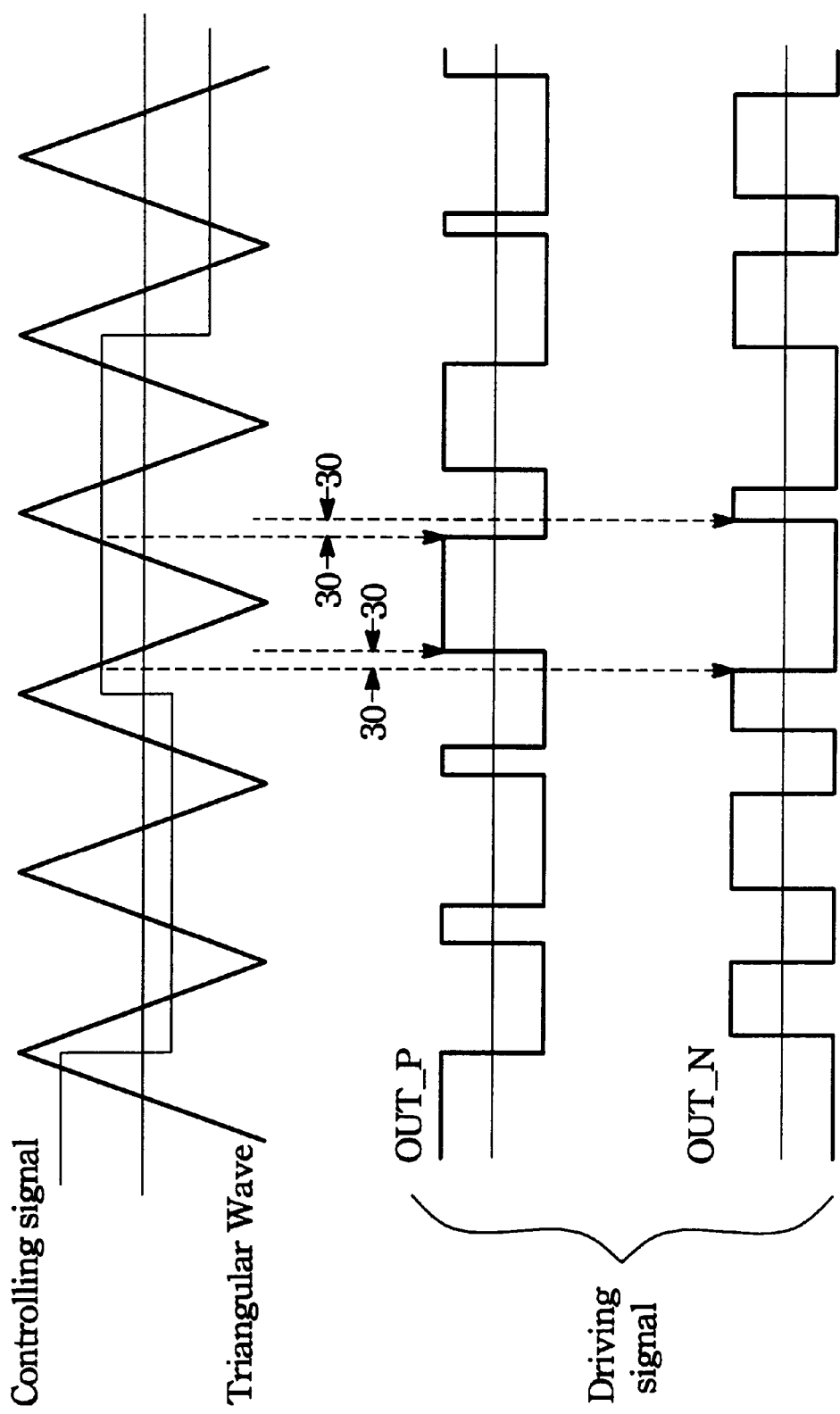
FIG. 4 illustrates a schematic timing diagram of a controlling signal and two driving signals in accordance with the present invention.
Figure 5:
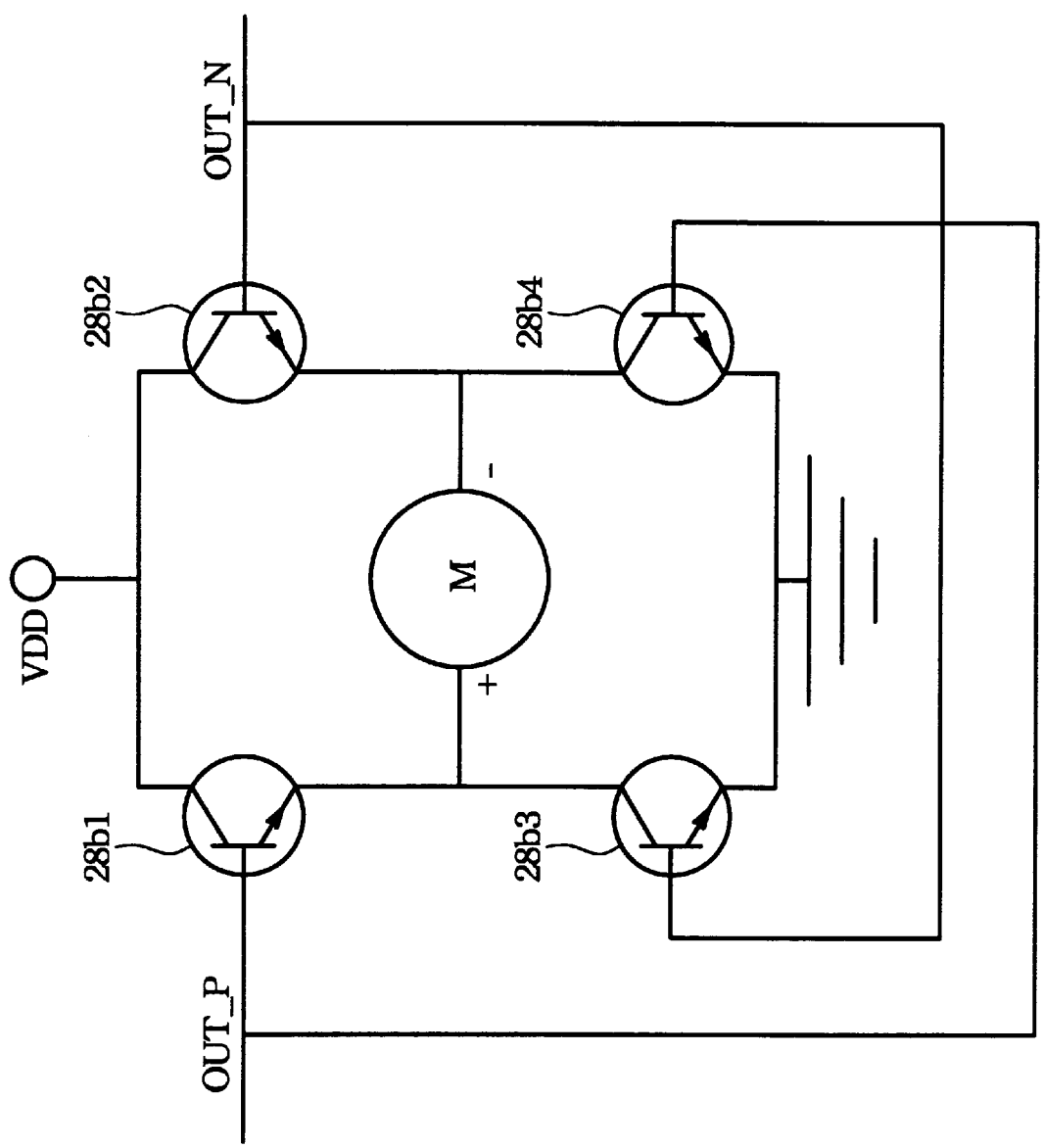
FIG. 5 illustrates a schematic diagram of a DC driving circuit in accordance with the present invention.

The driving circuit 28 is responsive to the controlling circuit 26 for driving the DC motor 20. The con trolling circuit 26 can include a pulse-width-modulation (PWM) driving circuit 28a and a DC driving circuit 28b. In the case, the controlling signal generated from the controlling circuit 24 is a digital signal. In order to drive the DC motor 20, the pulse-width-modulation (PWM) driving circuit 28a is used and the modulated signal is send through the DC driving circuit 28b to drive the DC motor 20. Referring to FIG. 4, the controlling signal can be transformed or modulated by a triangular wave, to two driving signals OUT_P and OUT_N for the DC driving circuit 28b. In the case, the DC driving circuit 28b is composed of four metal-oxide-semiconductor field effect transistors (MOSFETs) 28a1, 28a2, 28a3, and 28a4 which are cross connected with the DC motor 20, as shown in FIG. 5. The DC driving circuit 28b can be driven to move bi-directionally by inputting OUT_P and OUT_N. MOSFETs turning-on delaying periods (dead-time) 30 can be modulated between the leading and falling edges of OUT_P and OUT_N, in order to prevent short circuits under switching delay, as shown in FIG. 4.

Therefore, with the driving apparatus described as above, the DC motor 20 can be driven by the feedback circuit with the accompanying controlling and driving circuit. The operation of the scanning head can be accurately controlled with reduced vibration and noise. The prior art problem of using the stepping motor can be eliminated. By providing accurate positional and motional control, the image processing quality can be greatly improved. The cost can also be reduced with the low cost of the DC motor and the improved system design in the present invention.

As is understood by a person skilled in the art, the foregoing descriptions of the preferred embodiment of the present invention is an illustration of the present invention rather than a limitation thereon. It is intended to cover various modifications and similar arrangements included within the spirit and scope of the appended claims. The scope of the claims should be accorded to the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A driving apparatus for a position control, said driving apparatus comprising:

a DC motor;

position detecting means for detecting the position of an output shaft of said DC motor in order to generate first feedback signals;

position detecting means for detecting positions of said DC motor in order to generate second feedback signals;

an error counter responsive to input signals and said first and second feedback signals for generating error signals;

a controlling circuit responsive to said error signals for generating a digital control signal for controlling said DC motor; and a pulse-width-modulation driving circuit responsive to said digital control signal, said pulse-width-modulation driving circuit modulating said digital control signal with a triangular wave to generate a positive driving signal and a negative driving signal, in order to driving said DC motor through a four transistor direct current driving circuit.

2. The operation circuit of claim 1, wherein said position detecting means comprises a position encoder and a phase decoder.

3. The operation circuit of claim 1, wherein said controlling circuit performs a controlling scheme selected from the group consisting of a phase lead scheme, a phase lag scheme, and a PID scheme.

4. The operation circuit of claim 1, wherein said driving apparatus is employed for said position control of an image processing system.

* * * * *